ary Examiner—Gene Mancene
United States Patent [19]

Ritchey

[11] 4,359,015
[45] Nov. 16, 1982

[54] IDENTIFICATION TAG FOR LIVESTOCK
[76] Inventor: Eugene B. Ritchey, Rte. 2, Box 58, Brighton, Colo. 80601
[21] Appl. No.: 232,127
[22] Filed: Feb. 6, 1981
[51] Int. Cl.³ .............................................. A01K 29/00
[52] U.S. Cl. ..................................... 119/156; 40/301
[58] Field of Search .................. 119/156; 40/301, 300, 40/302

[56] References Cited

U.S. PATENT DOCUMENTS

| 495,270 | 4/1893 | Rozell | 40/301 |
| 547,424 | 10/1895 | Eaton | 40/301 |
| 630,349 | 8/1899 | Harvey | 40/301 |
| 3,552,051 | 1/1971 | Ritchey | 40/301 |
| 4,059,074 | 11/1977 | Furer et al. | 119/156 |
| 4,060,921 | 12/1977 | Robinson | 40/301 |
| 4,184,453 | 1/1980 | Ritchey | 119/156 |

FOREIGN PATENT DOCUMENTS 10829 10/1895 Switzerland .......................... 40/301
154081 7/1932 Switzerland .......................... 40/301

*Primary Examiner*—Gene Mancene
*Assistant Examiner*—Wenceslao J. Contreras
*Attorney, Agent, or Firm*—Fields, Lewis, Pittenger & Rost

[57] ABSTRACT

An identification tag with an hourglass configuration for livestock or other animals having a pair of separable tapered, geometric solid portions in the preferred form of conical sections wherein each portion has a large end and a small end whose sides taper at an acute angle away from the plane of an opening cut in the ear or other tissue of the animal to be tagged. No pressure is applied to the tissue around the opening and air is allowed to reach all portions of the opening to enhance healing. Piercing means extend from the smaller end of one of the portions and is used to form the opening in the ear. Means on the other portion secures the piercing means to the smaller end of the other portion after it has been passed through the opening.

17 Claims, 18 Drawing Figures

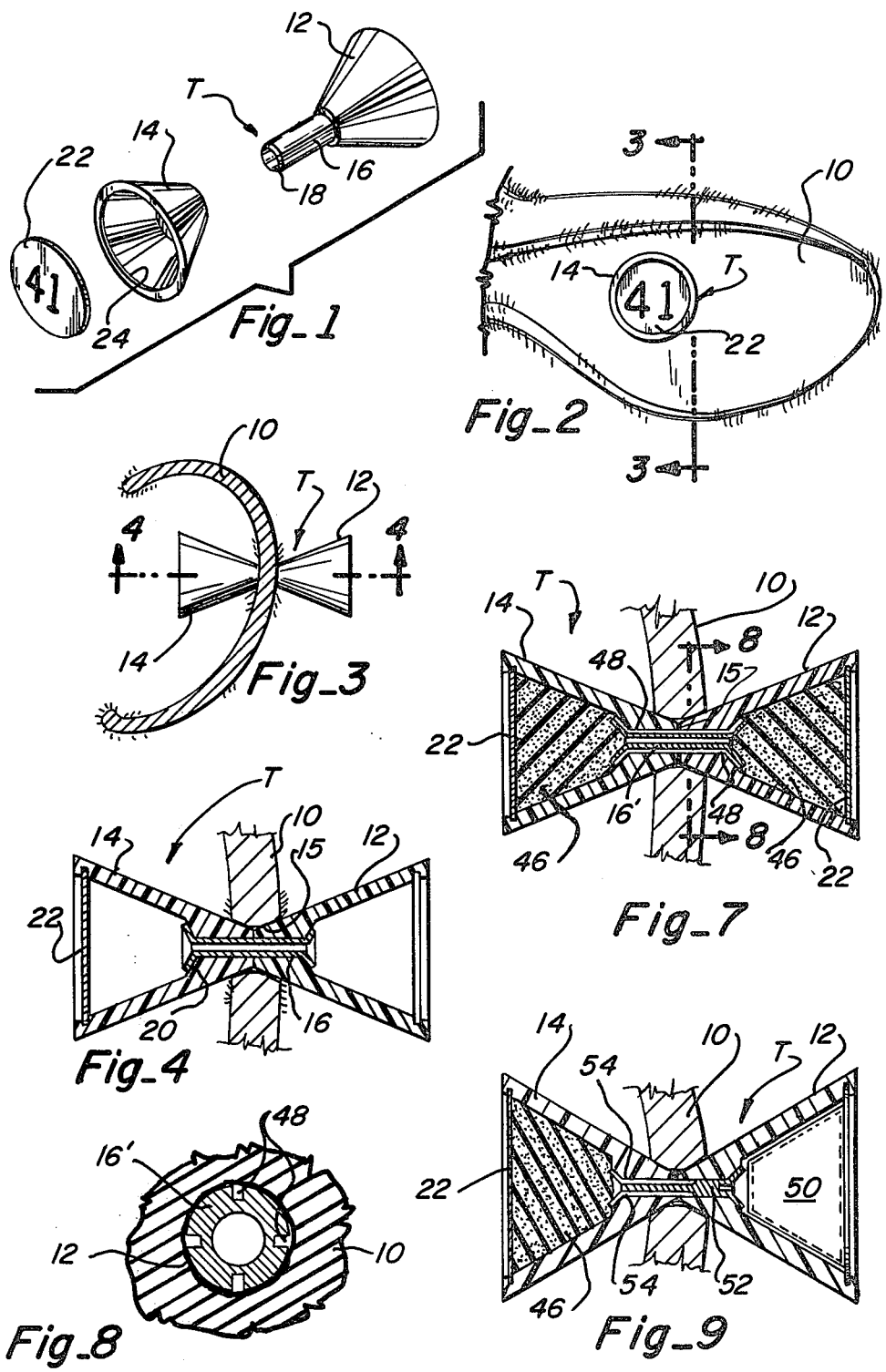

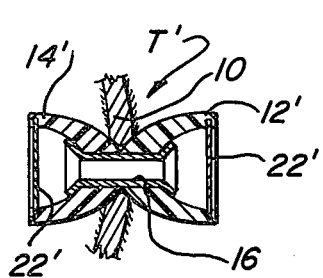
Fig_10
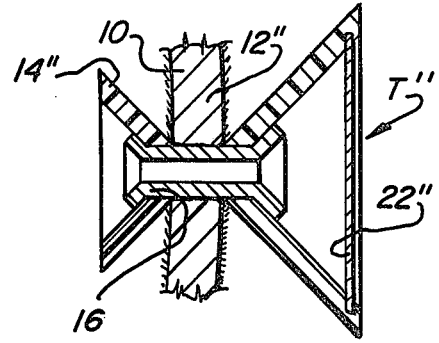
Fig_11
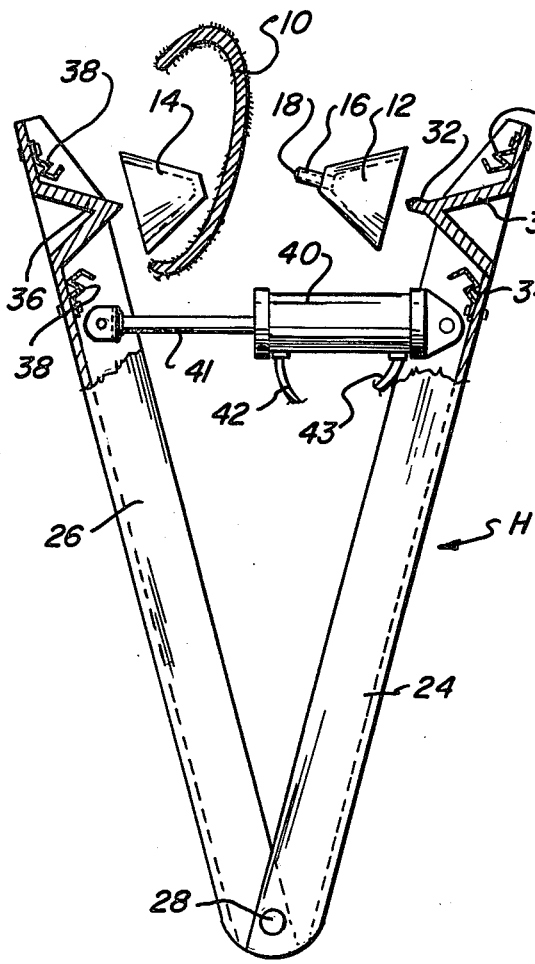
Fig_5
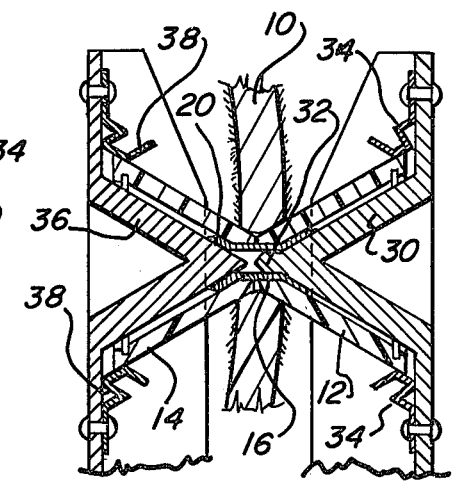
Fig_6
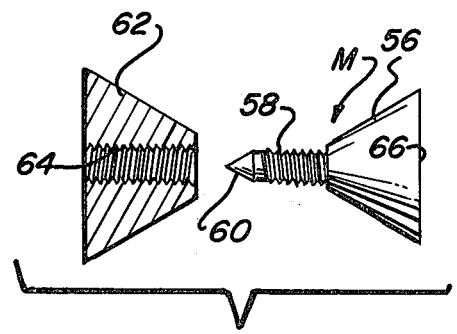
Fig_12

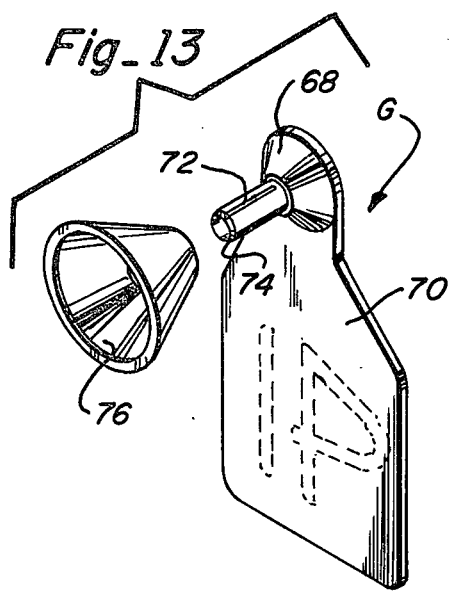
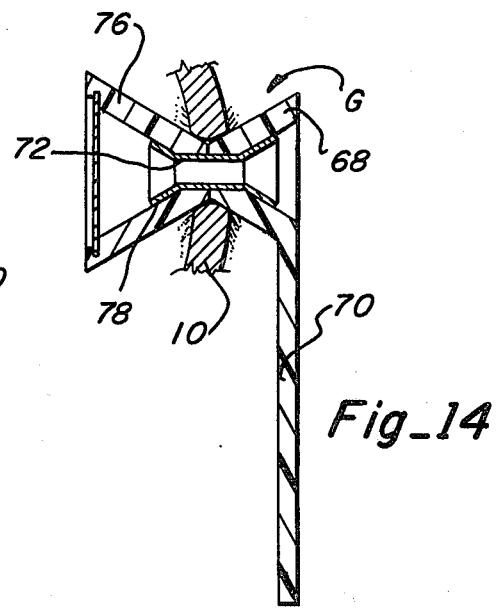
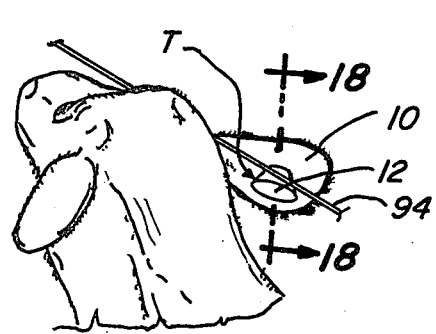
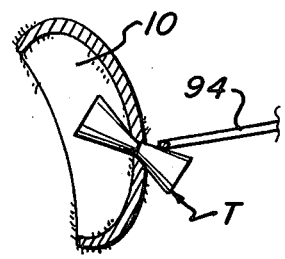
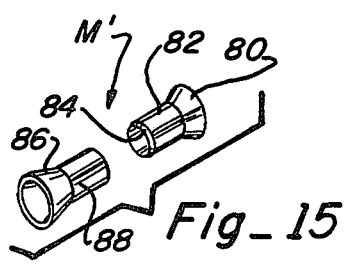
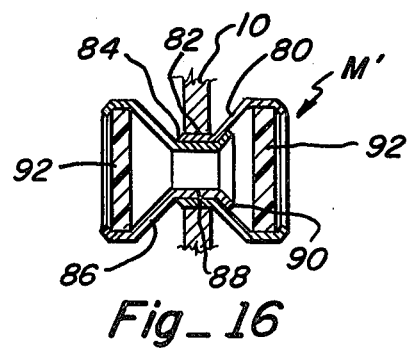

IDENTIFICATION TAG FOR LIVESTOCK

DESCRIPTION

TECHNICAL FIELD

This invention relates to an identification tag for livestock and other animals, and more particularly to an identification tag of the two piece, self-piercing type wherein two elements on opposite sides of the ear of the animal are joined together by a pin or other member passing through an opening cut in the ear.

BACKGROUND ART

In recent years, the use of plastic identification ear tags in cattle and livestock of all types has become increasingly popular. The sales for 1980 in the United States alone will be in excess of 47 million units. These tags are of generally two distinct types, namely the one piece tag and the two piece tag. The one piece tag typically is made of resilient elastomeric material of the type having a laterally extensive base for receiving indicia, and a locking device which can be folded in a particular manner for passage through a slit in the ear of an animal and then unfolded to lock it in the ear. This locking device is connected by a narrow neck to the base. Typically, these tags are placed in an installation tool which has a sharp cutting edge and are either pulled or pushed through a slit formed by this cutting edge until the locking device is on the other side of the ear and is released from the tool. A typical tab of this type is shown in my U.S. Pat. No. 3,552,051. These tags have enjoyed great commercial success in that they cause minimal damage to the ear and allow for rapid healing of the incision. However, they suffer the disadvantage in that they sometimes can be caught on a fence or tree and pulled from the ear and lost whereby the identification of the animal is destroyed. Furthermore, they suffer the disadvantage in that the manipulation of the tag to place it in the tool for installing is somewhat time consuming and awkward for some individuals and is particularly difficult to handle in field conditions when the weather is extremely cold.

The other type of tag which has enjoyed increasingly great commercial success is the two piece tag. This tag typically is also made of elastomeric material and has an extensive base section bearing indicia which terminates in a narrow neck portion. The distal end of the neck portion is provided with a small reinforced opening. The second piece of the tag is a locking device having a generally flat head with a central pin or shaft extending from one side of the head and terminating in an enlarged pointed end which has a maximum diameter greater than that of the pin or shaft. To install the tag, the pointed end is driven through the ear forming an incision and is forceably passed through and streaches and reinforced opening in the neck of the panel until it is locked in place on the shaft. These tags have enjoyed great commercial success because of their extreme ease of installation and ease of mounting in an installing tool. However, they have two very serious disadvantages. The first is that they cannot automatically be released from the ear when they catch on an obstruction and therefore, can cause the ear to be badly torn and in some instances, literally split in two. The other disadvantage is that when installed, the head of the pin and the reinforced portion around the opening in the panel are compressed against opposite surfaces of the ear adjacent the wound or opening formed in the ear. This restricts the flow of blood to the injured tissue, which retards healing. Furthermore, air cannot easily reach the injured tissue. The result is often necrosis of the tissue causing it to rot away leaving a very large hole in the ear. This allows undue movement of the tag in the ear causing erosion of the tissue or in some cases the hole becomes so large that the tag completely falls out of the ear.

DISCLOSURE OF THE INVENTION

A novel two piece identification tag has been provided which includes two separable tapered geometric solids having a larger end and a smaller end. A pointed pin or shaft for forming an opening in the skin of an animal extends from the smaller end of one of the portions and is installed by forcing it through the skin. The smaller end of the second portion is slidably received over the pin or shaft and is permanently connected thereto by suitable attaching means The tapered configuration of the two portions forms an identification tag having a generally hourglass configuration which permits air to reach the cut tissue for healing; does not apply any pressure to the surrounding skin area to restrict blood flow; pivots in any direction to shed obstructions easily; and provides at the larger end of the portions a place for placing suitable identifying indicia.

More particularly, the identification tag can be formed having a first and second tapered portion which are solids of revolution and more particularly, are conical sections. One of the conical sections includes a cylindrical shaft having either a piercing point or a tubular member having a tapered edge to form a sharp surface for cutting a circular hole in an ear of an animal, much in the manner of a leather punch. The shaft, connected to the first conical section, is driven through the ear by means of a suitable tool and the small end of the second conical section is placed over the protruding end of the shaft. The outer end of the piercing element is then flared to lock the second conical section in place to form the final configuration, which is hourglass shaped. In one embodiment, removable panels bearing suitable indicia may be attached to the outer larger ends of the conical portions. The conical portions can be of varying size and can have a hang tag attached thereto, if desired. Furthermore, these conical portions may be hollow to provide a reservoir for an insecticide, preferably contained in a porous sponge-like material. A groove may be provided along the shaft of the piercing element to allow the insecticide to travel by capillary action to the ear. In some applications, it may be desirable to place a transmitter in the hollow conical portion for transmitting a signal to a receiver held by the cattle owner to identify the cattle. Also, such as transmitter would have application for use of the tags on wildlife for subsequent location and identification. Because of the shape of the extending portions of the ear tag, it will easily pivot in any direction in the opening in the ear so as to shed branches, fences, wires and other obstructions which it may encounter without becoming caught thereon. This shedding feature is an important advantage not found in other two-piece tags. Furthermore, because of the tapered shape, when the tag does encounter an obstacle which pulls on it, and because of the elasticity of the ear, the bearing area on the ear is increased thereby minimizing any tearing of the ear. Finally, the identification of this tag can be used on various planes on the animal. Although the ear is the most popular area, it can also be used on the dewlap as well.

Additional advantages of this invention will become apparent from the description which follows taken in conjunction with the accompanying drawings.

BRIEF DESCRIPTION OF THE DRAWINGS

FIG. 1 is an exploded perspective view of a preferred form of the identification tag of this invention;

FIG. 2 is a front elevation of the identification tag of FIG. 1 installed in the ear of an animal;

FIG. 3 is an enlarged vertical section, taken along line 3—3 of FIG. 2 showing the position of the identification tag in the ear of an animal;

FIG. 4 is an enlarged horizontal section, taken along line 4—4 of FIG. 3 showing how the two portions of the tag are fastened together;

FIG. 5 is a side elevation of a stylized installation tool for the identification tag of this invention showing the position of the two portions of the tag before they are placed in the installing tool, portions of the installing tool being broken away for clarity of illustration;

FIG. 6 is a greatly enlarged vertical section of a portion of the installing tool and identification tag as it has been installed in the ear showing how the end of the post is flared to permanently attach the two sections of the identification tag together;

FIG. 7 is a horizontal section, similar to FIG. 4, but showing an alternative embodiment wherein insecticide is provided in opposite ends of the tag and conduit means is provided along the central post to convey the insecticide to the ear of the animal;

FIG. 8 is an enlarged vertical section, taken along line 8—8 of FIG. 7, showing further details of the construction of the center post;

FIG. 9 is a horizontal section similar to FIGS. 4 and 7, but showing a still further alternative embodiment wherein insecticide is provided in one end of the identification tag and an electronic transmitter is provided in the opposite end of the tag;

FIG. 10 is a horizontal section, similar to FIG. 4, showing an alternative embodiment of the invention in which the end portions of the tag have curved surfaces;

FIG. 11 is a horizontal section, similar to FIG. 4, showing a further alternative embodiment wherein the end sections of the identification tag are different sizes;

FIG. 12 is a horizontal section, similar to FIGS. 10 and 11, but showing a tag having a sharp piercing point on one section which is threadably received in the opposite section;

FIG. 13 is a perspective view of a further embodiment of this invention for use with a hang tag;

FIG. 14 is an enlarged vertical section of the hang tag of FIG. 13 showing it in assembled position in an ear;

FIG. 15 is an exploded perspective view of a small metal tag made in accordance with this invention;

FIG. 16 is an enlarged horizontal section showing the identification tag of FIG. 15 in installed position in an ear;

FIG. 17 is a view of an animal utilizing the ear tag of FIG. 1 which has become engaged with an obstruction; and FIG. 18 is an enlarged section, taken along line 18—18 of FIG. 17, showing the identification tag of this invention being canted or pivoted in response to engagement with an obstruction so that it sheds the obstruction without pulling the identification tag from the ear of the animal.

BEST MODE FOR CARRYING OUT THE INVENTION

In accordance with this invention, a novel identification tag T is disclosed in FIGS. 1-3 which is adapted to be received through an opening in the tissue of an animal, such as an animal's ear 10, as shown. Conveniently, the identification tag has two uniform tapered geometric solid portions such as cone 12 and cone 14. Attached to the smaller end of cone 12 is a post or shaft 16 having a chamfered cutting edge 18, similar to the cutting edge of a leather punch, which cuts through the flash of the animal, such as the ear cartilage to form an opening 15, so that shaft 16 can pass therethrough. Thereupon, the small end of cone 14 is placed over the opposite end of shaft 16 and the chamfered end 18 is flared to form an enlarged portion 20, as best seen in FIG. 4, which permanently attaches cone 14 to the shaft. Conveniently, an end plate 22 may be snapped into a peripheral rim 24 at the end of one or both cones and may be provided with suitable indicia for identification.

By looking at FIG. 4, it is apparent that air will reach the wound, caused by cutting the opening, to enhance healing. Additionally, there is no pressure against the area surrounding the ear which would cause restriction of blood flow and possible necrosis. Furthermore, it is apparent that, because all portions of the conical surface are at an acute angle to the surface in which the opening is made, it would be difficult for the identification tag to become entangled or caught on objects, as will be discussed more fully below.

A stylized hand tool H is illustrated in FIGS. 5 and 6 which can be used for installing the tool in a fast and efficient manner. The hand tool H, as shown, comprises a first arm 24 and a second arm 26 pivoted together at their ends, as by pin 28. The opposite end of arm 24 is provided with a first cone holder 30 which is shaped generally like cone 12 and has a pointed end 32 which extends into the portion of shaft 16 when the cone is placed over cone holder 30 and held in place, as by spring clips 34. The second arm 26 is provided at its opposite end with a cone holder 36 for receiving cone 14 which is also held in place, as by spring clip 38. After the cones 12 and 14 have been mounted on the arms, ear 10 is positioned between them and then the arms are quickly squeezed together, as by means of hydraulic cylinder 40 connected at one end to arm 24 and having a piston rod 41 connected to arm 26, as seen in FIG. 5. The cylinder is operated by supplying hydraulic fluid through hydraulic lines 42 and 43, as is well understood by one skilled in the art. As can best be understood by viewing FIG. 6, as the arms 24 and 26 of the hand tool H are squeezed together, the portion of the ear to be cut is supported by the small end of truncated cone 14 as the cutting edge 18 of shaft 16 punches a hole in the ear and is driven through the ear and through the opening in the small end of cone 14 whereupon the pointed end of cone holder 36 enters the end of shaft 16 and causes it to be flared or expanded to form an enlarged portion 20 which prevents cone 14 from coming off of shaft 16. To release the tool, cylinder 40 is extended back to the position shown in FIG. 5. It will be understood that pressure could be applied by hand rather than through a hydraulic cylinder and a return spring could be provided for reopening the tool, all as readily understood by one skilled in the art.

As shown in FIG. 7, the hollow conical portions 12 and 14 can be filled with a sponge-like material 46, such as open-cell polyurethane which can contain an insecticide or other medication for the ear of the animal in which the identification tag is placed. In this embodiment, a shaft 16 is provided with a plurality of circumferentially-spaced, longitudinally-extending grooves 48 as seen in both FIGS. 7 and 8 through which the insecticide may be supplied, as by capillary action, to the ear at the intersections of the cones.

A further alternative embodiment is shown in FIG. 9 wherein cone 12 is provided with a transmitter 50 for transmitting radio signals to a receiver for identifying the animal and its location. In this embodiment, a shaft 52 is provided which is generally solid but has a plurality of circumferentially-spaced, longitudinally-extending grooves 54 extending toward cone 14 so that insecticide in the material 46 may be transmitted by capillary action to the ear 10 but will not pass into the area in cone 12 containing transmitter 50.

Another alternative embodiment is shown in FIG. 10 wherein cones 12' and 14' are convex in shape and provided with end plates 22'. It should be understood that they can also be concave in shape, however the convex or straight configuration provides for better shedding of obstacles which the identification tag may encounter.

In FIG. 11, an identification tag is shown having one large cone 12" and a smaller cone 14" which may be desirable in some instances, particularly where an end plate, such as end plate 22' is needed only on one side of the ear.

An additional embodiment is shown in FIG. 12 wherein the identification tag M is made entirely of metal, such as aluminum or brass and comprises a first solid conical end 56 having a threaded shaft 58 formed integrally therewith and terminating in a piercing point 60 for forming an opening in an ear or other body tissue of an animal to be identified. A second conical end 62 is provided with an internally threaded bore 64 for receiving the point 60 and threaded shaft 58 to attach the identification tag to the animal. Suitable indicia can be imprinted on the flat end surface of conical end portion 56.

A still further alternative identification tag G which is of the hang tag variety is shown in FIGS. 13 and 14. This tag includes a first conical end 68 to which a hang tag 70 is attached or formed integrally therewith. A hollow cylindrical shaft 72 extends therefrom and has a bevelled cutting edge 74 for cutting a hole in the ear or other skin tissue of the animal to be tagged. A second conical end 76 is receivable over shaft 72 after the shaft has been inserted through the ear. Conveniently, the shaft is then flared to form an enlarged end 78, as seen in FIG. 14 to prevent cone 76 from coming off of the shaft. If desired, an end panel bearing indicia can be placed in the end of cone 76 to provide identification on both sides of the ear. Also, the hang tag can have indicia on both sides thereof.

A second, very small metal tag M' is shown in FIGS. 15 and 16 which can be used on very small animals. Tag M' includes a first hollow conical section 80 having a hollow shaft 82 extending therefrom. Shaft 82 has a bevelled edge 84 for cutting a hole in the tissue of ear 10. The other end includes a conical section 86 having a tubular shaft 88 extending from the small end and receivable in shaft 82 as best seen in FIG. 16. As in the other embodiments, the end of tube 88 can be flared to form an enlarged end 90 so that the two sections are permanently locked together. If desired, end plates 92 can be provided in the respective conical sections 80 and 86 bearing indicia to identify the animal. Alternatively, numbers can be stamped either on the inside or outside of the conical surface prior to assembly and preferably during manufacture to provide the identification.

Finally, in FIGS. 17 and 18, the shedding feature of the identification tag of this invention is illustrated. Although it has been illustrated with respect to identification tag T, it will be understood that the same feature is true of all embodiments. The ear of an animal is shown having the ear tag T therein whose conical end 12 has become engaged with a strand 94 of barbed wire fencing. As can be seen, the tapered shape causes the identification tag to pivot in the ear so that the obstruction, such as strand 94, does not become permanently entangled with the identification tag. Furthermore, should one end of the tag become entangled and be pulled on the ear, the ear will distort and a larger bearing surface will be created against the other conical or tapered portion of the tag minimizing the chance of tearing the opening in the ear before the identification tag becomes disentangled and released from the obstruction.

From the foregoing, it can be seen that a novel two piece identification tag has been provided in accordance with this invention. The tag is easily installed and is of the self-piercing variety that forms an opening in the tissue or ear of the animal in which it is placed as it is installed. Furthermore, the tapered geometric solid shape causes the surface of the tag to be at an acute angle to the ear of the animal so air is allowed to reach the wound formed by making the opening in the ear so that it can heal. Conveniently, there is no pressure placed on the tissue around the wound by the tag which would cause necrosis of the tissue. Advantageously, the tapered shape facilitates the shedding of any object which the identification tag encounters so that it slides off and does not tear the tag from the ear. In addition, should the tag become caught on a obstruction, the distortion of the ear, together with the novel shape of the tag, provides an increased bearing area to minimize the change of ear damage.

The invention has been described in detail with particular reference to preferred embodiments thereof, but it will be understood that variations and modifications can be effected within the spirit and scope of the invention.

I claim:
1. An identification tag for animals that is installed in an opening cut through the skin tissue of the animal wherein the tag enhances healing of the opening and will shed obstructions, said tag comprising:
   a first conical portion to be positioned on one side of the opening with the smaller end toward the opening;
   a second conical portion to be positioned on the opposite side of the opening with the smaller end toward the opening; and
   means positionable through the opening to connect said smaller ends of said conical portions together within the opening, the surface of said conical portions extending away from the opening at an angle to the skin tissue so that said surface does not normally contact the skin tissue and will shed away obstacles coming into contact with said surface.
2. An identification tag for animals that is installed in an opening cut through the skin tissue of the animal wherein the tag enhances healing of the opening and will shed obstacles, said tag comprising:
   a pair of bulbous portions, each formed so that the surface thereof tapers away from the opening at an acute angle without contacting the skin tissue, at least one of said portions having identifying means; and
   means extendable through the opening for joining said bulbous portions together on opposite sides of the opening.

3. A tag, as claimed in claim 2, wherein:
   said joining means is integral with one of said bulbous portions and is removably connected to the other of said bulbous portions.

4. A tag, as claimed in claim 1, wherein said joining means includes:
   a hollow shaft extending from the small end of one conical portion and having a sharp edge at the distal end for cutting through the tissue of the animal.

5. A tag, as claimed in claim 4, wherein at least one of said portions is hollow, said tag further including:
   insecticide containing means in said hollow portion; and
   conduit means in said shaft for transmitting insecticide from said insecticide containing means to the opening.

6. A tag, as claimed in claim 5, wherein said conduit means comprises:
   a plurality of longitudinally-extending, circumferentially-spaced grooves in the outer periphery of said shaft.

7. An identification tag for animals that is installed in an opening cut through the skin tissue of the animal wherein the tag enhances healing of the opening and will shed obstructions, said tag comprising:
   a pair of separable tapered portions, each having a larger end and a smaller end formed as a solid of revolution;
   means joining said smaller ends of said portions through said opening, the taper of said portions causing them to be spaced at an angle to the skin tissue and allowing air to reach the edges of said opening all around its periphery to promote rapid healing and causing them to shed any obstacle coming into contact with said portions.

8. An identification tag for animals that is installed in an opening cut through the skin tissue of the animal wherein the tag enhances healing of the opening and will shed obstacles, said tag comprising:
   a body having an hourglass configuration wherein the neck of the configuration is positionable in the opening, said configuration being separable into two halves; and
   means for connecting said two halves together wherein the configuration of each half extends away from the skin tissue at an angle thereto to facilitate healing of the opening and to shed obstacles coming into contact therewith.

9. An identification tag for animals that is installed in an opening cut through the skin tissue of the animal wherein the tag enhances healing of the opening and will shed obstacles, said tag comprising:
   a pair of separable tapered portions having a larger end and a smaller end, each formed as a geometric solid whose sides taper at an acute angle away from the plane of the opening and the skin tissue to allow air to reach all portions of the opening to enhance healing; and
   piercing means extending from the smaller ends of one of said portions for forming the opening in the skin; and
   means on the other portion for securing said piercing means to the smaller end of said other of said portions after it has passed through the skin and formed the opening.

10. A tag, as claimed in claim 9, wherein said piercing means includes:
    a hollow shaft with a tapered cutting edge at the distal end for cutting out a generally circular plug of tissue to form the opening.

11. A tag, as claimed in claim 9, wherein:
    said smaller end of said other portion is received over said distal end of said piercing means; and
    said distal end is flared so that said other portion is permanently attached to said piercing means.

12. A tag, as claimed in claim 9, wherein said piercing means includes:
    a sharp point for puncturing the tissue to form the opening.

13. A tag, as claimed in claim 12, wherein:
    said securing means is formed on said piercing means adjacent said point.

14. A tag, as claimed in claim 13, wherein:
    said securing means comprises male threads on said piercing and mating female threads in said other portion.

15. A tag, as claimed in claim 9, wherein:
    said portions each have means for releasable holding indicia bearing means.

16. A tag, as claimed in claim 9, wherein:
    at least one of said portions is hollow.

17. A tag, as claimed in claim 16, wherein:
    a radio receiver or transmitter is positioned in at least one of said hollow portions.

* * * * *